United States Patent [19]

O'Hara

[11] 4,419,535

[45] Dec. 6, 1983

[54] MULTI-CABLE CONDUIT FOR FLOORS AND WALLS

[76] Inventor: Robert J. O'Hara, 2809 Covert Rd., Glenview, Ill. 60025

[21] Appl. No.: 288,767

[22] Filed: Jul. 31, 1981

[51] Int. Cl.³ .................................. H02G 3/22
[52] U.S. Cl. ................................ 174/48; 52/232; 169/48
[58] Field of Search ..................... 174/48, 49, 151; 248/56; 52/232, 220, 221; 169/48

[56] References Cited

U.S. PATENT DOCUMENTS

| | | |
|---|---|---|
| 2,097,394 | 10/1937 | Fullman . |
| 2,125,366 | 8/1938 | Young et al. . |
| 2,142,165 | 1/1939 | Young et al. . |
| 2,279,791 | 4/1942 | Lamb . |
| 2,732,226 | 1/1956 | Brattberg . |
| 3,380,208 | 4/1968 | Cook . |
| 3,803,341 | 4/1974 | Klinkman et al. . |
| 3,864,883 | 2/1975 | McMarlin .................. 174/48 X |
| 3,976,825 | 8/1976 | Anderberg ................. 174/151 |
| 3,995,102 | 11/1976 | Kohaut ..................... 174/48 |
| 4,086,736 | 5/1978 | Landrigan .................. 52/221 |
| 4,093,818 | 6/1978 | Thwaites ................... 174/48 |
| 4,189,619 | 2/1980 | Pedlow ..................... 174/48 |
| 4,245,445 | 1/1981 | Heinen ..................... 52/221 |
| 4,249,353 | 2/1981 | Berry ....................... 248/56 X |
| 4,291,195 | 9/1981 | Blomquist et al. ........... 174/48 |

OTHER PUBLICATIONS

Building Materials Directory, Underwriters Laboratories Inc., Jan. 1981, pp. 507–523.

*Primary Examiner*—A. T. Grimley
*Assistant Examiner*—D. A. Tone
*Attorney, Agent, or Firm*—Leydig, Voit, Osann, Mayer & Holt, Ltd.

[57] ABSTRACT

A multi-cable conduit has a housing which is opened at opposite ends, and a plurality of partitions dividing the interior of the housing into a plurality of compartments extending between the open ends. Each of the compartments is sized to receive a multiplicity of cables extending through the compartment and the open ends of the housing, and the compartments are elongated in a direction transverse to the axes of the cables. The partitions are slidably supported within the housing so that each partition can be separately inserted into, and removed from, the housing. A lining of intumescent material is provided on the walls of each compartment for expanding into and sealing each of the compartments in response to a fire. Compartments or portions of compartments which are not filled with cables are filled with a nonflammable insert. At least one end of each compartment is also sealed to limit the transmission of smoke through the compartments prior to expansion of the intumescent material. Directing means are also provided at the open ends of the compartments for focusing the expansion of the intumescent material into the compartments.

27 Claims, 20 Drawing Figures

MULTI-CABLE CONDUIT FOR FLOORS AND WALLS

DESCRIPTION OF THE INVENTION

The present invention relates generally to conduits for passing multiple cables, such as telephone cables, through walls and floors of buildings. The invention particularly relates to such conduits which include means for limiting the passage of heat, flame, smoke and gases through cable openings in walls and floors.

When a building must be provided with holes through the floors or walls to provide passageways for bundles of cables, such as computer or communication cables or the like, fires can quickly spread through such holes from floor to floor or from room to room. To reduce or eliminate this fire hazard, such passageways are often sealed with a variety of different sealing means, such as a packing of mineral wool or silicone foam around the cables. More sophisticated sealing techniques use a heat expandable or intumescent material which expands and fills a conduit cavity in response to the elevated temperatures of a fire. Devices using this technique are described in U.S. Pat. Nos. 3,864,883; 3,995,102; and 4,093,818, for example. One of the major drawbacks of these devices is that they are costly. More specifically, they are costly to install as they require a high level of skill and substantial cable installation time, especially for custom fitting. Then it is difficult or virtually impossible to inspect the integrity of the seal. Furthermore, subsequent additions of cables are limited to cables of a certain size and to certain patterns of installation. Also subsequent removal of cables is limited by the extensive labor involved. For these reasons as well as by inherent design, the prior devices make inefficient use of the cross-sectional area of the opening in the floor or well. Other disadvantages include lack of protection against smoke, such as from smoldering materials; the need to tailor units to specific cable sizes; and cleaning and maintenance problems due to various projecting and recessed structures.

It is, therefore, a primary object of the present invention to provide an improved intumescent-type multi-cable conduit which not only protects against fires and the attendant smoke and hot gases, but also is extremely simple to install, requiring only a few minutes of semi-skilled labor.

It is another important object of this invention to provide an improved multi-cable conduit which is capable of accommodating a wide variety of different types and sizes of cables in a single conduit structure without any custom fitting or special tailoring, and which permits the cables to be arranged in a completely random fashion.

A further object of this invention is to provide such an improved conduit which provides a high cable density per square foot. A related object is to minimize the amount of space that is not available to be occupied by cables within the conduit and, therefore, to minimize the size of the opening required in a wall or floor to accommodate the conduit.

Still another object of the invention is to provide such an improved multi-cable conduit which permits the cables to be easily and quickly inserted through the conduit, or removed therefrom, without cutting the cable or rearranging or even disturbing previously inserted cables.

Yet another object of the present invention is to provide such an improved multi-cable conduit which can be installed virtually flush with the surface of the floor or wall in which it is installed, without projecting brackets, fasteners or other fittings. In this connection, it is also an objective to provide such a conduit which does not pose any cleaning or other maintenance problems after it is installed.

Still another object of the present invention is to provide such an improved conduit which can be readily inspected, e.g., for integrity of the smoke seal, from the exterior without removing or disassembling the conduit.

A still further object of the invention is to provide such an improved multi-cable conduit which limits the transmission of smoke through the conduit at all temperatures, even when the cable insulation or sheathing decomposes due to the intense heat of a fire. A corollary objective is to provide such a conduit that limits the transmission of smoke from smoldering materials and the like which do not produce temperatures high enough to expand an intumescent material.

A further object of this invention is to provide such an improved multi-cable conduit which can be efficiently and economically manufactured in large numbers.

Other objects and advantages of the invention will be apparent from the following detailed description and the accompanying drawings, in which:

FIG. 13 is a section taken generally along line 13—13 in FIG. 12;

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Figures 1, 2, 3:
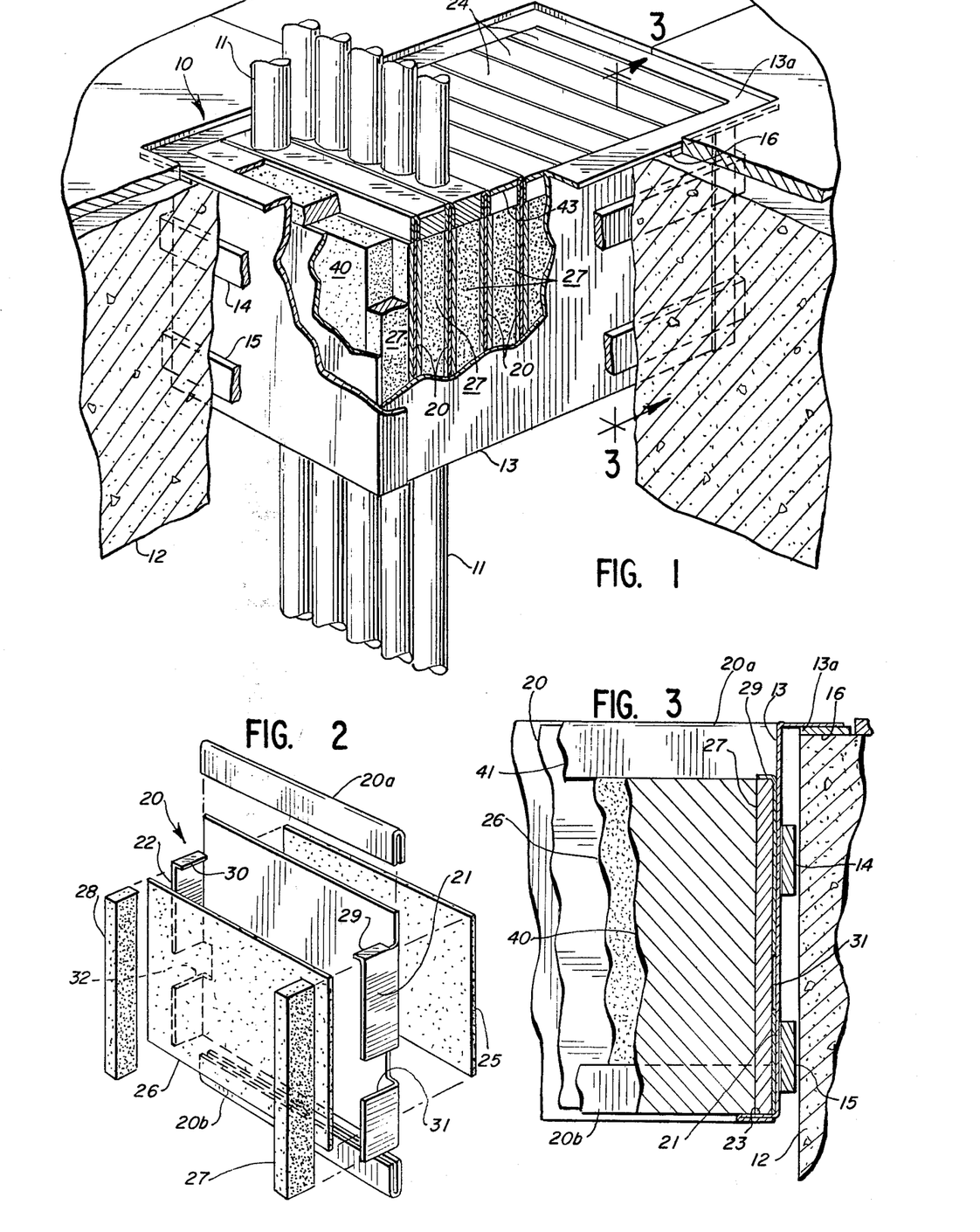
FIG. 1 is a perspective view, partially broken away to show the internal structure, of a floor conduit embodying the present invention.
FIG. 2 is an exploded perspective of one of the partition subassemblies in the conduit of FIG. 1.
FIG. 3 is an enlarged section taken generally along line 3—3 in FIG. 1, with portions thereof broken away to show the underlying structure.

Turning now to the drawings and referring first to FIG. 1, there is shown a rectangular conduit 10 for passing multiple cables 11 through a concrete floor 12. The conduit housing 13 is inserted into a hole passing vertically through the floor 12 to permit the passage of the cables 11 therethrough. The housing 13 is preferably formed of sheet metal in the configuration of a rectangular frame which is open at both the top and bottom. The conduit-receiving hole in the floor 12 is formed slightly larger than the housing 13, and bands 14 and 15 of intumescent material encircle the outside walls of the housing and are bonded thereto. These bands to intumescent material expand and seal off the gap between the housing 13 and the walls of the floor hole in the event of a fire.

The top edge of the housing 13 forms an outwardly extending flange 13a which overlaps the surface of the floor 12 to support the housing. To seal the gap between the housing 13 and the walls of the floor hole against the passage of low-temperature smoke, a gasket 16 is placed beneath the flange 13a.

To divide the interior of the housing 13 into a plurality of compartments extending vertically therethrough, a plurality of partitions 20 are inserted therein. These partitions 20 are preferably made of sheet metal, and have integral side flanges 21 and 22 (see FIG. 2) along the vertical edges thereof so that each partition is U-shaped in horizontal section. The U-shaped partitions 20 slide into the housing 13 with the outer surfaces of the flanges 21 and 22 sliding along the interior walls of the housing 13, and come to rest in supporting engagement with a horizontal flange 23 formed around the bottom edge of the housing (see FIG. 3). The partitions 20 are preferably stacked loosely against each other within the housing 13 so that each pair of flanges 21, 22 nearly abuts the main partitioning wall of an adjacent partition. The two endmost partitions 20 abut the respective end walls of the housing 13. This stacking arrangement forms a multiplicity of relatively narrow rectangular-shaped compartments 24, each of which is capable of receiving cables 11 of varying sizes in random order.

The bottom flange 23 on the housing section 13 is folded back on itself (see FIG. 3) to avoid a sharp edge that might cut the cables 11. The top and bottom edges of the partitions 20 are protected by folded metal or plastic strips 20a and 20b (see FIG. 2) for both safety and reinforcement.

In order to seal the various rectangular compartments 24 in the event of a fire, and thereby prevent the fire and attendant smoke and fumes from spreading via the cable passageway through the floor, each of the compartments 24 is lined with an intumescent material. Intumescent materials are well known in the art and exhibit a high coefficient of cubic expansion under conditions of elevated temperature so that they expand extensively (and largely irreversibly) when subjected to heat. In the illustrative embodiment of FIGS. 1–9, linings 25 and 26 of intumescent material are affixed to opposite sides of the main wall of each partition 20, and additional linings 27 and 28 of the same material are affixed to the inside surfaces of the two side flanges 21 and 22. At the one end of the housing where the endmost partition 20 has its flanges 21 and 22 abutting the end wall of the housing, the housing end wall also has an intumescent lining on the inside surface thereof. In the event of a fire, the linings of intumescent material expand into tight sealing engagement with the cables 11 passing through the respective compartments 24. Even if some of the cables 11 are of small diameter, leaving substantial voids within the compartments 24, the intumescent material from the linings 25–28 completely fills such voids so that the compartments are completely sealed off to prevent the transmission of fire and smoke therethrough.

As is well known, the heat transfer from any fire is due to a combination of conduction, convection, and radiation. In a serious, major conflagration, the primary mode of heat transfer is via radiation. The effect of the narrow "slots" formed by the compartments 24 is to absorb most of the radiation in the intumescent linings rather than to allow it to be transmitted to vulnerable material on the other side of the conduit. In effect, the general geometry of the conduit transforms the large rectangular opening into a series of adjacent slots each of which functions in the same manner as a "peep-hole" into a furnace to protect the materials on the "cold" side.

The heat expandable linings 25–28 typically comprise an intumescent material such as sodium silicate and/or potassium silicate in combination with a non-flammable filler material such as alumina, silica, mineral wool, glass fibers etc. Such materials are commercially available as prefabricated sheets which can be adhesively bonded to the desired surface. One example of such an intumescent sheet is FS-195 made by 3M Company of St. Paul, Minn. A lining of such material only $\frac{1}{8}$ inch in thickness is sufficient to substantially fill a rectangular compartment having a cross-sectional area about one inch by six inches, and the pressure of the expanding material is sufficiently high that it presses into all the little crevices and interstices among the cables and parts of the conduit. At the initial blast of hot gases and/or radiation from a fire, these intumescent materials start to expand in response to the elevated temperatures, so that the rectangular compartments 24 are gradually filled and sealed off before the fire or attendant hot gases and smoke have had a chance to penetrate through the conduit. Moreover, the expansion starts on the fire side, squeezing the deteriorating insulation on the cable 11 to prevent a flue-like opening through the seal as the cable insulation deteriorates from the heat of the fire. The expansion proceeds approximately linearly as long as any empty spaces remain in the compartment. As will be described below, a simple cold smoke seal on the top side of the conduit prevents the transmission of smoke prior to completion of the expansion of the intumescent material.

Figure 6:
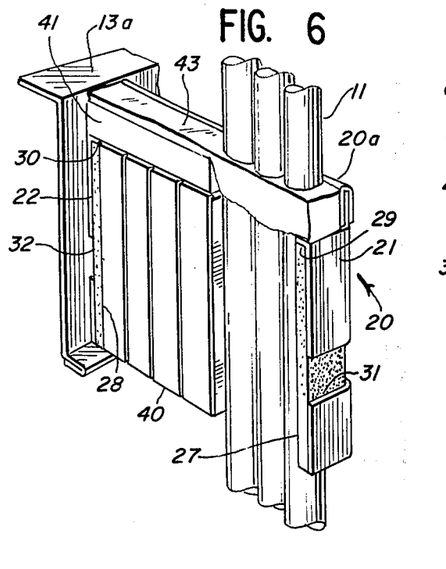
FIG. 6 is a perspective view of the internal structure of one of the compartments in the conduit of FIG. 1 with three cables installed therein.
Figure 7:
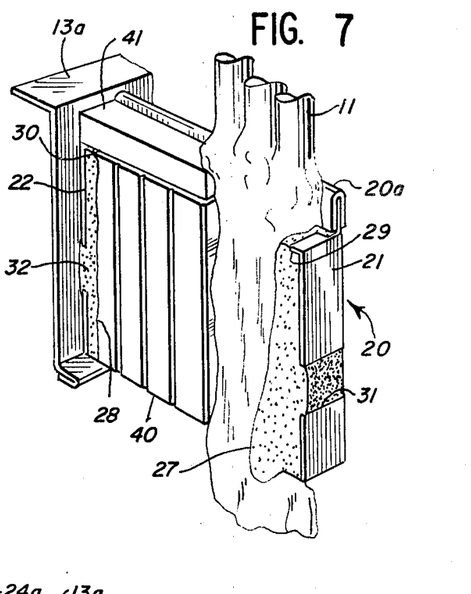
FIG. 7 is the same perspective view shown in FIG. 6 but showing the structure after the intumescent material has been partially expanded by an elevated temperature due to a fire below.
Figure 8:
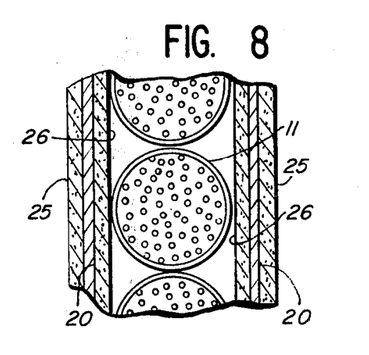
FIG. 8 is an enlarged section taken generally along line 8—8 in FIG. 6.
Figure 9:
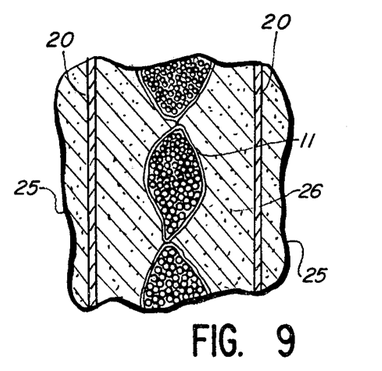
FIG. 9 is an enlarged section taken generally along line 9—9 in FIG. 7.

The sealing action of the intumescent linings 25–28 in one of the compartments 24 is illustrated in FIGS. 6–9, where FIGS. 6 and 8 show the linings in their normal unexpanded condition, and FIGS. 7 and 9 show the intumescent material after it has expanded. In the particular example illustrated, only three cables, of uniform diameter, are shown as passing through the compartment 24, but it will be understood that the sealing action of the intumescent material is the same regardless of the number and/or size and/or pattern of arrangement of the cables. It can be seen that the intumescent linings 25–28 all expand inwardly from the compartment walls, surrounding the cables 11 and pressing against them so tightly that the cables actually are slightly crimped (see FIGS. 7 and 9). The smallest interstices between the cables 11 become filled with the expanded material, thereby completely sealing off the compartment 24. Moreover, as will be described in more detail below, the expansion of the thicker end pieces of intumescent material 27 and 28 is focused into the ever-decreasing internal volume; thus the intumescent material is used very efficiently and, therefore, a relatively small amount of the costly material is required.

The intumescent linings 25–28 typically expand to more than five times their original thickness, so the linings are capable of filling the entire compartment 24, even if it is completely empty, because they expand inwardly from all four vertical side walls. Consequently, cables of a variety of different sizes can be installed in the conduit in completely random fashion without affecting the sealing action of the intumescent linings in the event of a fire.

Figure 5:
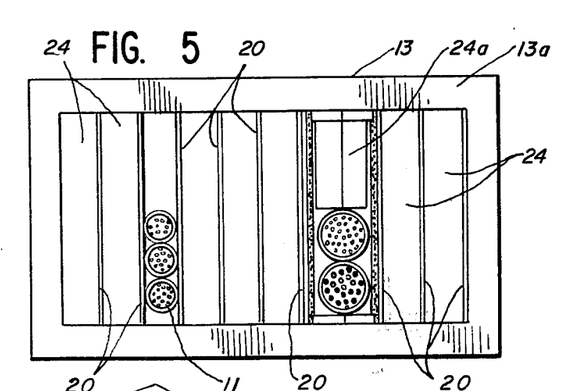
FIG. 5 is a top plan view, on a reduced scale, of the conduit of FIG. 1 with five telephone cables of different diameters installed therein, before the sealant has been added to the one enlarged compartment.

If it is desired to install cables having a larger diameter than the width of one of the compartments 24, one of the partitions 20 is simply reversed (and additional intumescent material is added) to form a compartment nearly twice as wide as the other compartments. This type of installation is illustrated in FIG. 5 which shows two larger cables 11a received in a compartment 24a formed by reversing one of the partitions 20. Of course, additional partitions could be removed to form an even wider compartment (with appropriate additions of intumescent material to augment the lining). Enlargement of the compartments in this manner tends to dilute the effectiveness of the radiation "peep-hole" effect described above, and thus it is desirable to maintain the narrow elongated compartments to the maximum extend possible in any given application.

Whenever it is necessary to remove one or more of the partitions 20 to accommodate larger diameter cables, the amount of intumescent material available in the new oversized compartment 24a should be increased by inserting a strip of the intumescent material between the cables, bending the strip into a serpentine shape so that it engages alternate sides of successive cables and becomes interlocked therewith. When a larger compartment is made by simply reversing one of the partitions, an extra layer of intumescent material may be laminated to the main side walls of the two partitions defining the enlarged compartment.

For the purpose of directing the expansion of the intumescent linings 27 and 28 into the rectangular compartments 24, rather than out through the open top of the housing section 13, a pair of flanges 29 and 30 extend inwardly from the top ends of the respective side flanges 21 and 22, across the upper ends of the linings 27 and 28 on the inner surfaces of the flanges 21 and 22. At the bottom ends of the flanges 21 and 22, the horizontal supporting flange 23 formed on the lower edge of the housing section 13 performs the same function. These flanges all direct the initial expansion of the intumescent material into the compartments 24, as a result of which the subsequent expansion tends to continue in the same direction. Consequently, the major portion of the final expanded mass is contained within the compartments 24 to form a highly effective seal which will block the penetration of fire and smoke for extended periods of time.

As can be seen most clearly in FIGS. 2, 3, 6 and 7, central portions of the side flanges 21 and 22 are cut away to form openings 31 and 32 through which the intumescent linings 27 and 28 can expand into direct engagement with the interior walls of the housing 13, thereby sealing the narrow gaps between the flanges 21, 22 and the adjacent housing walls. The force of the expanded material also wedges it firmly in place across the full width of the housing 13, exerting a substantial outward pressure on the interior surface of the housing, thereby tending to cause the housing walls to bulge outwardly toward the adjacent surfaces of the floor 12 in which the conduit is installed; during a fire this opening would have a tendency to expand.

In order to prevent the penetration of a flash fire through the various compartments 24 or portions thereof that are not filled with cables, such compartments or portions thereof are filled with non-flammable inserts. Thus, in the illustrative embodiment of FIGS. 1–9, non-flammable boards 40 are inserted into the empty compartments 24 to fill those portions which are lined with the intumescent material. A second non-flammable board 41 is laid on top of each board 40 to fill the upper region of each compartment 24, above the top edges of the intumescent linings 25–28. These inserts 40 and 41 are made of non-flammable particulate and/or fibrous material, preferably held together by a small amount of non-flammable binder such as bentonite. Examples of particulate and fibrous materials suitable for use in these boards are sand, perlite, vermiculite, clay, fiberglass, mineral wool, asbestos, alumina etc.

The inserts 40 and 41 also serve to hold the partitions 20 in place during shipment to avoid damage thereto, serve as a check on the dimensions of the partitions during manufacture, and resist buckling of the housing 13. Sealing of the empty compartments is also facilitated by the inserts 40 and 41, as will be apparent from the ensuing description.

Figure 4:
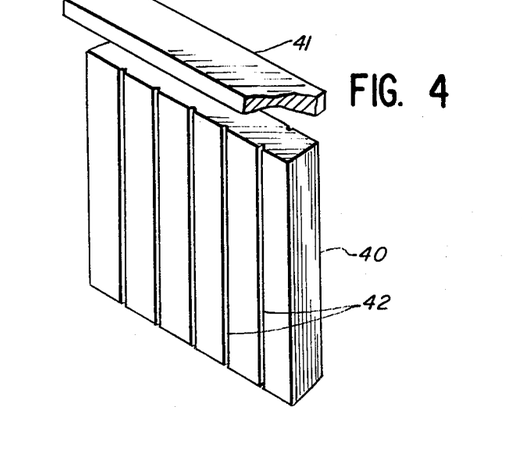
FIG. 4 is a perspective view of a pair of inserts used in the conduit of FIG. 1.

As illustrated in FIG. 4, each of the inserts 40 is preferably provided with a series of vertical grooves 42 to facilitate removal of a portion of the insert for use in compartments that are only partially filled with cables, such as the compartments shown in FIGS. 5–7. The distance between the grooves 42 is normally about the same as the width of one of the compartments 24.

In order to block smoke from passing through the conduit 10 at temperatures which are too low to initiate expansion of the intumescent material, or before sufficient time has elapsed to allow full expansion of the intumescent material, a cold smoke seal is formed between the walls of each compartment and any inserts therein, at the top of each compartment. Thus, in the illustrative embodiment of FIGS. 1-9, a sealant 43 is poured onto the top of each board 41 so that it flows into any slits or other openings remaining between the walls of each compartment 24 and the board 41 therein. One example of a suitable sealant for this purpose is Dow Corning 3140 RTV coating made by Dow Corning Corporation, Midland, Mich., which is a flowable silicone rubber curable at room temperature. This is a thick, viscous liquid which fills the voids around the periphery of the board 41 without running too far down into the conduit. When it is desired to use one of the compartments 24 after it has been sealed, it is a simple matter to strip away the sealant and the top refractory board 41 (which will normally be at least partially bonded to the sealant).

A silicone caulking or putty is used to seal the voids around the cables 11 at the top of each compartment 24. A suitable caulking for this purpose is Type PR-855 RTV silicone foam made by Product Research and Chemical Corp., Glendale, Calif. As an alternative, the voids around the cables may be packed with an alumina silica fiber and then covered with the same type of sealant used on the inserts 41. During the initial moments of a major fire this caulking or sealant is protected from the radiation by the "peep-hole" effect of radiation absorption or attenuation in the narrow slot-like compartments 24. FIG. 6 illustrates an alternative where the top board is cut off, re-inserted, and then sealed by application of caulking and a self-leveling liquid sealant (used to fill in any gaps).

In FIGS. 10-13, there is illustrated a modified floor conduit for use in applications involving a number of smaller cables or one large cable. In this embodiment the conduit housing is in the form of a cylinder, comprising an upper section 50 telescoped into a lower section 51. The two housing sections 50 and 51 are pre-assembled and set to the desired axial length by means of a set screw 52. The preassembled housing sections are then inserted into a preformed hole or slot in the concrete floor. Flanges 50a and 51a on the ends of the respective housing sections 50 and 51 overlap the adjacent concrete surfaces. Then the voids are filled with grout. This obviates the need for the "cold smoke seals" provided around the exterior of the unit of FIGS. 1-9.

Figure 10:
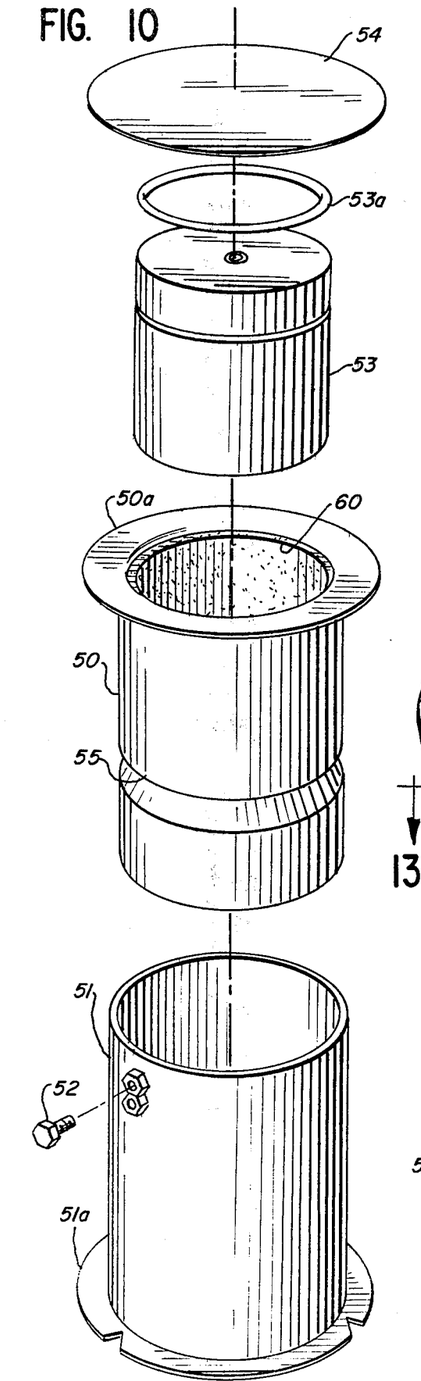
FIG. 10 is an exploded perspective of a modified floor conduit embodying the invention.
Figure 11:
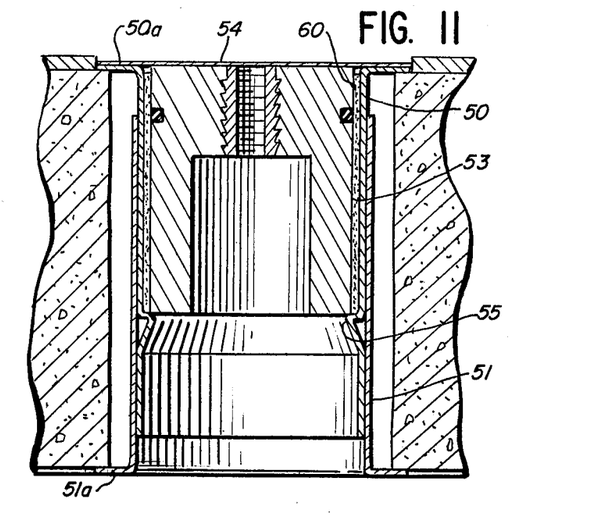
FIG. 11 is a vertical section of the conduit of FIG. 10 installed in a floor but prior to the installation of any cables therein.
Figure 12:
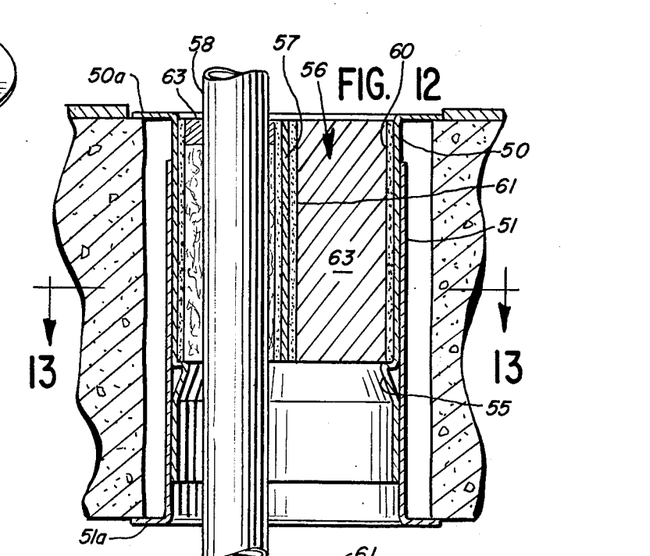
FIG. 12 is a vertical section of the conduit of FIG. 10 installed in a floor with a telephone cable passing therethrough.

To provide continuity of the floor surface until the cylindrical conduit housing is ready to be used, a removable high-temperature, cold-molded plug 53 is inserted into the upper housing section 50 and covered with a plate 54. The cover plate 54 can be adhesively bonded to the top of the plug 53 and the top of the flange 50a. The plug 53 rests on an internal flange 55 formed as an integral part of the upper housing section 50 by indenting a circumferential section thereof. An internally threaded sleeve 57 is embedded in the top of the plug 53 to receive a bolt for withdrawing the plug from the conduit when it is desired to pass cables therethrough. An O-ring 53a inserted in a groove in the outer surface of the plug 53 provides a cold smoke seal.

The interior of the cylindrical housing section 50 is divided into four compartments 56 by a cross-shaped partition 57 inserted therein in place of the plug 53 when the plug is removed. This partition 57 rests on the same flange 55 that supported the plug 53. Each of the compartments 56 normally receives only a single cable 58, but a plurality of smaller cables can be nested in each compartment if desired. Also, the partition 57 can be designed with a variety of other configurations to provide any desired number of compartments of the same or different sizes. The general geometry of the small compartments also provides for an added "peep-hole" effect similar to that obtained in the rectangular floor unit of FIGS. 1-9. In this instance the significance of the "peep-hole" subdivision is diminished as the round, "pipe-like" shape of the circular conduit serves as an effective "peep-hole" by itself.

The intumescent lining for the cylindrical conduit is provided in the form of a lining 60 on the inside surface of the upper housing section 50, extending down as far as the flange 55, and a lining 61 on all the vertical walls of the partition 57. As can be seen most clearly in FIG. 13, the combination of the linings 60 and 61 forms a lining of intumescent material extending completely around each of the four compartments 56. Consequently, in the event of a fire each compartment 56 is completely filled by the expanding intumescent material, which will also seal itself tightly against the cable or cables passing through each compartment to block the transmission of fire and smoke through the conduit. Non-flammable inserts 62 are disposed within any of the compartments 56 or portions thereof which do not contain a cable. These inserts have a shape roughly complementary to that of the compartments 56, and are made of the same material as the inserts 40 and 41 described above in connection with the embodiment of FIGS. 1-9.

In order to form a seal which blocks the transmission of smoke through the cylindrical conduit at temperatures below the temperature at which the intumescent linings 60-61 expand, a sealant 63 is poured onto the top of each insert 62; and a filler of silicone caulking or mineral wool is pressed around each of the cables 58 and a sealant poured thereon to provide a cold smoke seal. The effect of the "peep-hole" geometry described above serves to protect the "cold smoke seal" in this case, as in the case of the rectangular floor conduit of FIGS. 1-9, although the radiation absorption slots are shaped significantly differently.

Figure 14:
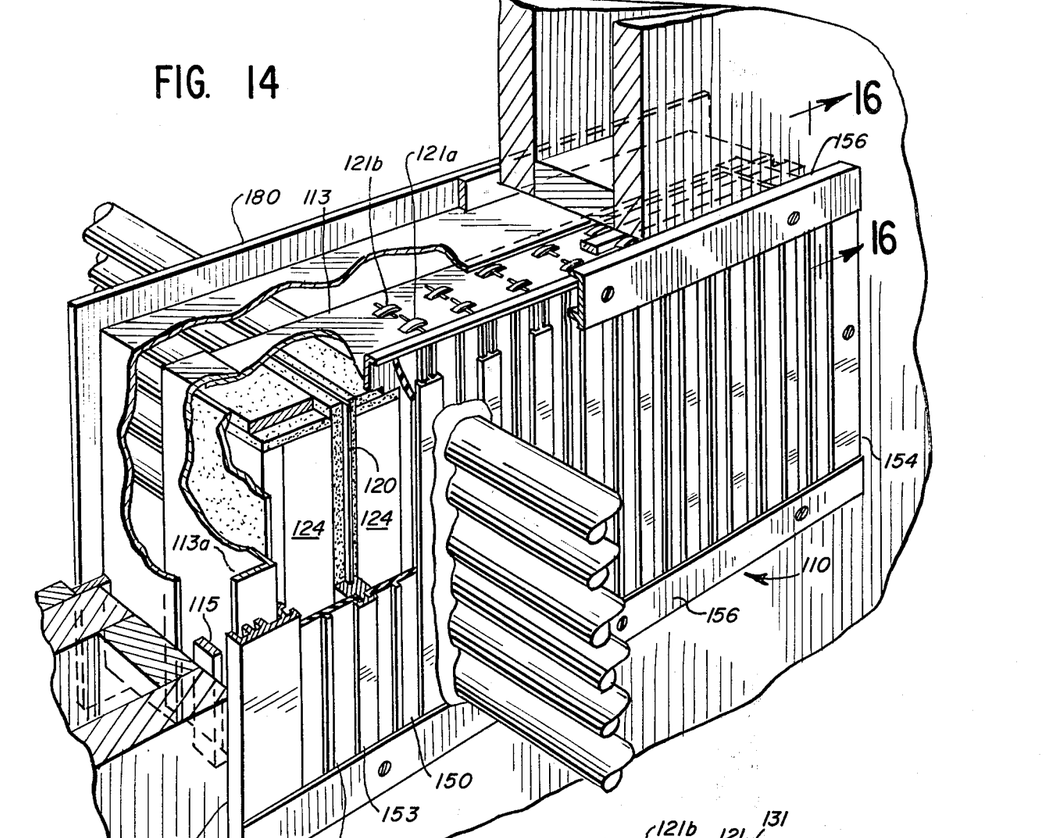
FIG. 14 is a perspective view, with fragments thereof broken away to show the internal structure, of a wall conduit embodying the invention.
Figures 19, 20:
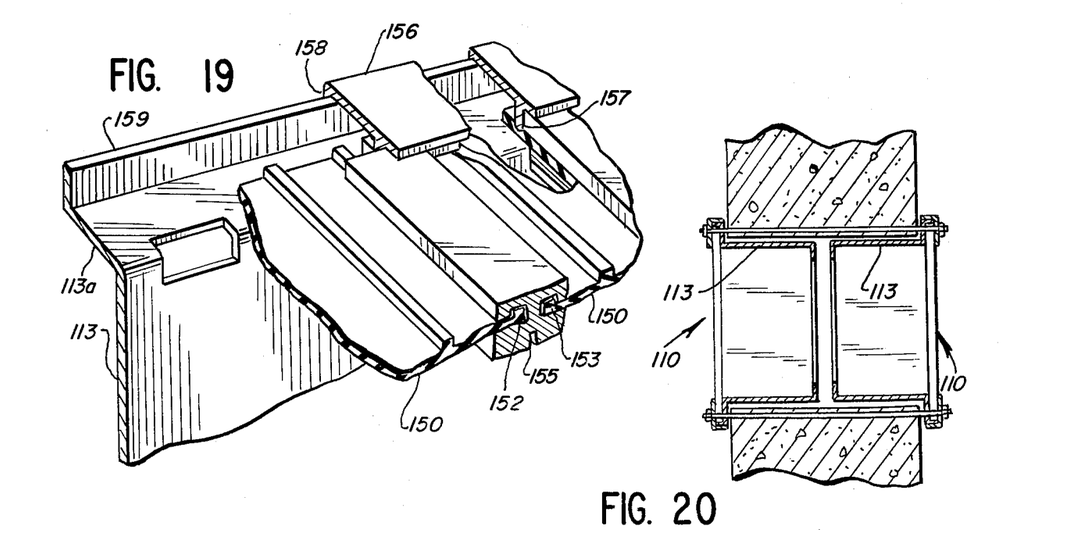
FIG. 19 is an enlarged perspective of a fragment of the front of the conduit shown in FIG. 14, with portions thereof broken away to show the underlying structure.
FIG. 20 is a vertical section showing the housing portions of the conduit of FIG. 14 installed in a wall, prior to the installation of any cables therein.

Turning next to FIGS. 14-20, there is shown a rectangular conduit 110 for use in walls rather than floors. This conduit 110 is similar in many respects to the rectangular floor conduit of FIGS. 1-9, but a completely different "cold" seal arrangement is provided for the open ends of the conduit because it is disposed vertically, rather than horizontally as in the case of the floor conduit. As illustrated in FIG. 20, two of these conduits are normally used in a cable hole in a "two-hour" masonary wall, on opposite sides thereof. However, one conduit, with an auxillary sleeve-type cold smoke shield is sufficient in a "one-hour" wall formed of wallboard and wooden studs. It is this latter type of installation that is shown in FIG. 14.

The housing for the conduit 110 comprises a box-shaped housing 113, preferably formed of sheet metal, having an outwardly extending flange 113a overlapping the surface of the wall with a gasket 114 disposed between the wall and the flange. A band 115 of intumescent material encircles the outside walls of the housing 113, and is bonded thereto, to seal off the gap between the housing and the wall hole in the event of a fire.

To divide the interior of the housing 113 into a plurality of rectangular compartments extending horizontally therethrough, multiple partitions 120 are inserted into the housing 113. Each of these partitions 120 has integral top and bottom flanges 121 and 122 (see FIG. 15) which slide along the respective top and bottom walls of the housing 113 until they engage an inwardly extending flange 123 formed around the inner or rear edge of the housing 113. The partitions 120 are fitted generally against each other within the housing 113 to form narrow rectangular compartments 124, with the two endmost partitions abutting the respective end walls of the housing.

For the purpose of accurately positioning the partitions 120 within the housing 113, a pair of loops 121a and 121b are struck out of each of the top flanges 121, and a similar pair of loops (not shown) are struck out of each of the bottom flanges 122. When the partition 120 is inserted into the housing 113, these loops 121a and 121b snap into a pair of complementary slots 113b and 113c (see FIGS. 14-16) in the top wall of the housing 113. Similar slots (not shown) are provided in the bottom wall of the housing for receiving the corresponding loops on the bottom flange 122. The flanges 121 and 122 are somewhat elastic so that they can be bent inwardly while the partition 120 is being inserted into the housing 113, and then they spring back when the loops 121a and 121b come into register with the slots 113b and 113c. This causes the loops 121a and 121b to enter the slots 113b and 113c, thereby holding the partition 120 in the desired position within the housing 113 and relative to the other partitions. If it is desired to lock the partitions in these detent positions, small links of wire 121c may be inserted through the respective loops along the outer surfaces of the flanges 121 and 122 (see FIGS. 14-16). This is particularly desirable during shipment of the assembled conduit units.

Figure 15:
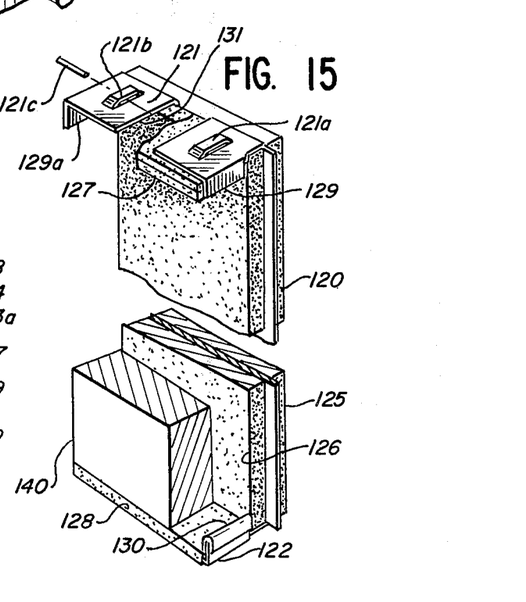
FIG. 15 is a partial perspective view of one of the partition subassemblies in the conduit of FIG. 14.
Figure 16:
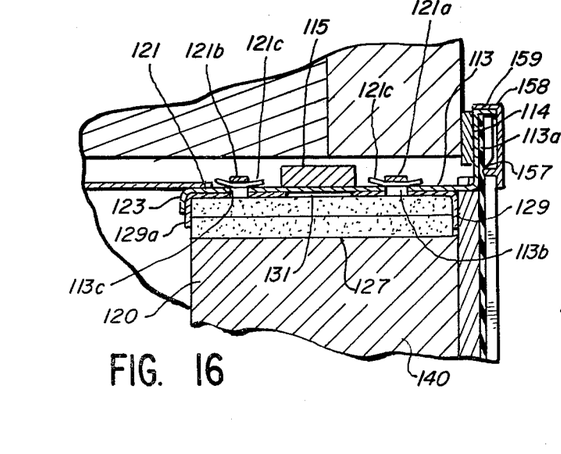
FIG. 16 is an enlarged section taken generally along line 16—16 in FIG. 14.
Figure 17:
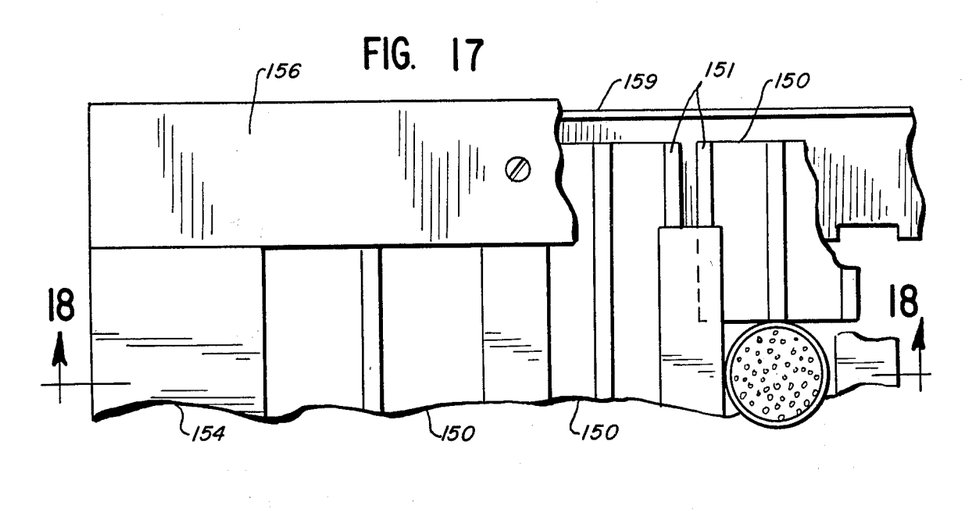
FIG. 17 is a partial top plan view, on an enlarged scale and with portions thereof broken away to reveal the underlying structure, of the conduit of FIG. 14 with the sealant removed from around the cable.
Figure 18:
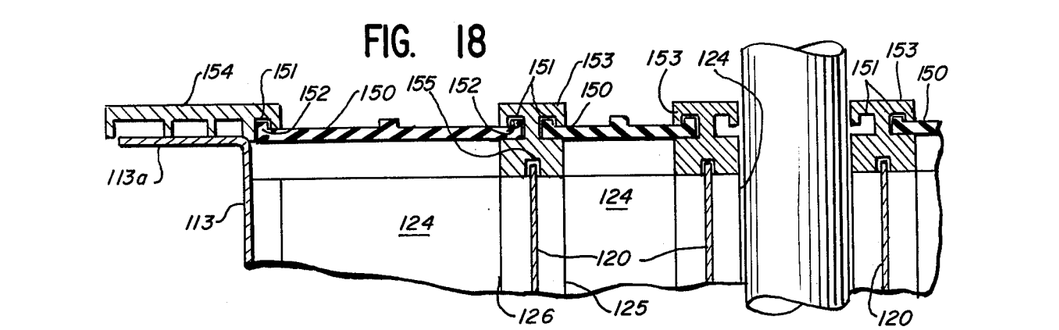
FIG. 18 is a section taken generally along line 18—18 in FIG. 17.

Alternatively, the loops 121a, 121b and slots 113b, 113c can be rotated 90° with respect to the orientation indicated in FIGS. 14-16. In this arrangement the central openings 31 and 32 are moved toward the bottom of the flanges 21 and 22.

The intumescent linings for the multiple compartments 124 formed by the partitions 120 are provided by linings 125 and 126 on opposite surfaces of each main partitioning wall, and by linings 127 and 128 on the inner surfaces of the top and bottom flanges 121 and 122, respectively. These intumescent linings 125-128 function in the same general manner as the linings 25-28 described above in connction with FIGS. 1-9 except that the top piece 127 is double the thickness of the lower piece 128. The front and rear edges of both the flanges 121 and 122 form inwardly extending flanges 129, 129a and 130, 130a respectively, to direct the expanding intumescent material into the respective compartments 124. The end portions of the bottom flanges 130, 130a covered with a protective clip to avoid exposing the cables 111 to sharp edges which could cut the cables.

Central openings 131 and 132 are formed in the central portions of the flanges 121 and 122, respectively, to permit the expanding intumescent material to expand into direct engagement with the interior walls of the housing 113. This seals the gaps between the flanges 121 and 122 and the adjacent housing walls, and also wedges the expanded body of intumescent material firmly in place between the top and bottom walls of the housing.

To fill any compartments 124 or portions thereof that are not filled with cables 111, non-flammable boards 140 are inserted into any such empty compartments. These inserts 140 function in the same manner as the inserts 40 described above in connection with FIGS. 1-9.

As in the case of the floor conduit FIGS. 1-9, the wall conduit of FIGS. 14-20 transforms a large opening into a series of adjacent slots creating a series of radiation "peep-holes" which serve to protect the materials on the "cold" side. In this case it also serves to protect the "cold smoke seal" to be described below.

In order to form a "cold smoke seal" across the front surface of the conduit 110, the front of each compartment 124, or portion thereof, which does not contain any cables 111 is sealed by a flexible resilient blind 150. One suitable material for these blinds 150 is silicone rubber. The vertical edges of each blind 150 are provided with ribs 151 which ride in complementary slots 152 formed by vertical metal or plastic extrusions 153 and 154 (see FIGS. 18 and 19) seated in notches 150a in the front of the housing 113 (see FIG. 19). The rear surface of each extrusion 153 and 154 also has an additional slot 155 adapted to receive the front edge of one of the partitions 120, thereby assuring alignment of the blinds 150 with the compartments 124 formed by the partitions 120.

To secure the blinds 150 to the front of the housing 113, a pair of horizontal strips 156 are fastened to the outwardly extending flange 113a extending around the front edge of the housing. Each of the strips 156 includes a longitudinal rib 157 (see FIG. 16) which squeezes the blinds 150 tightly against the housing flange 113a to complete the seal. A second rib 158 on each strip 156 overlaps a lip 159 on the outer edge of the flange 113a to complete the enclosure.

As can be seen most clearly in FIG. 14, the combination of the two vertical end pieces 154 and the two horizontal strips 156 form a front frame for the wall conduit 110. These four members are all secured to the housing 113 by a plurality of screws 160, although any other suitable fastening means could be used for this purpose.

One of the advantages of the illustrative sealing arrangement for the wall conduit 110 is that each individual blind 150 can be easily moved back and forth in the vertical direction by simply removing the horizontal strips 156. Because the rectangular compartments 124 are elongated in the vertical direction, the stack of cables 111 passing through any given compartment 124 will always fill the bottom of the compartment before the top. Consequently, if any given compartment 124 is not completely filled, the blind 150 for that compartment can be simply lowered until it engages the topmost cable 111, and then cut off to the exact length to fit under the top lip 159 on the housing. This makes the installation quick and simple, thereby keeping the installation cost to a minimum.

The "cold smoke shield" as described above is adequate provided there is no fire on that side of the wall. In the event of fire on that side of the wall, however, an additional "cold smoke shield" is required on the other side of the wall. In the case of "two-hour" masonary wall illustrated in FIG. 20, a second conduit provides the required "cold smoke shield" on the other side of the wall, with through bolts 170 holding the two conduits together to prevent the intumescent material from forcing one or both of the units out of the wall. In the case of the "one-hour" stud wall illustrated in FIG. 14, an auxillary "cold smoke shield" is provided on a sleeve-type support 180 which slides into the wall and may optionally fit over the outside of the conduit 110 relatively snugly for positioning. This sleeve 180 is preferably made of sheet metal and is equipped a "cold smoke shield" structure (not shown) similar to that on the front of the conduit 110, as described above. That is, the sleeve 180 includes all the same elements as the conduit 110 except the partitions 120, the inwardly extending flange on the inner edge of the housing, and the intumescent linings.

I claim as my invention:

1. A multi-cable conduit comprising
   a housing having openings at opposite ends thereof,
   a plurality of partitions dividing the interior of said housing into a plurality of compartments extending between said openings and communicating therewith, each of said compartments being sized to receive a multiplicity of cables extending through the compartment and the open ends of the housing, said compartments also being elongated in a direction transverse to the axes of said cables,
   means for supporting said partitions within said housing,
   a lining of intumescent material on the walls of each of said compartments for expanding into and sealing each of said compartments in response to a fire,
   a non-flammable insert for filling any of said compartments, or portions thereof, that are not filled with cables, and
   sealing means forming a seal between the walls of each compartment and any cables therein, said sealing means beng located at at least one of the open ends of each compartment, to limit the transmission of smoke through said compartments prior to expansion of said intumescent material.

2. A multi-cable conduit as set forth in claim 1 wherein each of said partitions is separately removable from, and insertable into, said housing.

3. A multi-cable conduit as set forth in claim 1 wherein said housing is box-shaped with rectangular openings at opposite ends thereof, and said partitions divide said rectangular openings into a multiplicity of parallel rectangular slots.

4. A multi-cable conduit as set forth in claim 1 wherein said housing is made of sheet metal and has an inwardly extending flange at one open end for supporting said partitions.

5. A multi-cable conduit as set forth in claim 1 wherein said housing is made of sheet metal and has an outwardly extending flange at one open end thereof for overlapping and supportingly engaging the surface of a floor or wall receiving said conduit, and gasket means disposed between said flange and the floor or wall surface.

6. A multi-cable conduit as set forth in claim 1 wherein each of said partitions includes a main body portion forming the partition, and a pair of flanges along opposite edges thereof for engaging the opposed internal walls of said housing, the inner surfaces of said flanges being lined with said intumescent material, the ends of said flanges adjacent at least one of the open ends of said housing being turned inwardly to form directing means for forcing the expansion of said intumescent material into said compartments.

7. A multi-cable conduit as set forth in claim 1 wherein a portion of each of said flanges is cut away to provide an opening through which said intumescent material can expand into direct engagement with the interior walls of said housing.

8. A multi-cable conduit as set forth in claim 1 wherein said sealing means comprises a plurality of elongated resilient blinds each of which covers an open end of one of said compartments, means for pressing the ends of said blinds against said housing, and means for slidably supporting the longitudinal edges of said blinds to permit said blinds to be separately removed for the insertion of cables in the corresponding compartments, said supporting means also interconnecting the longitudinal edges of said blinds to form a smoke seal across one open end of said housing.

9. A multi-cable conduit as set forth in claim 1 which includes detent means for positioning said partitions within said housing.

10. A multi-cable conduit as set forth in claim 1 which includes directing means at the open ends of said compartments for focusing the expansion of said intumescent material into said compartments.

11. A multi-cable conduit comprising
    a housing havng openings at opposite ends thereof,
    a plurality of partitions dividing the interior of said housing into a plurality of compartments extending between said openings and communicating therewith, each of said compartments being sized to receive a multiplicity of cables extending through the compartment and the open ends of the housing, said compartments also being elongated in a direction transverse to the axes of said cables,
    a lining of intumescent material on the walls of each of said compartments for expanding into and sealing each of said compartments in response to a fire, and
    means for slidably supporting said partitions within said housing so that each partition can be separately inserted into, and removed from, said housing.

12. A multi-cable conduit as set forth in claim 11 wherein at least a portion of said lining of intumescent material for each of said compartments is attached to said partitions.

13. A multi-cable conduit as set forth in claim 11 wherein each of said partitions includes a main body portion forming the partition, and a pair of flanges along opposite edges thereof for engaging the opposed internal walls of said housing, the inner surfaces of said flanges being lined with said intumescent material, the ends of said flanges adjacent at least one of the open ends of said housing being turned inwardly to form directing means for focusing the expansin of said intumescent material into said compartments.

14. A multi-cable conduit as set forth in claim 13 wherein a portion of each of said flanges is cut away to provide an opening through which said intrumescent material can expand into direct engagement with the interior walls of said housing.

15. A multi-cable conduit as set forth in claim 11 which includes detent means for positioning said partitions within said housing.

16. A multi-cable conduit as set forth in claim 11 which includes directing means at the open ends of said compartments for focusing the expansion of said intumescent material into said compartments.

17. A multi-cable conduit comprising
    a housing having openings at opposite ends thereof,
    a plurality of partitions dividing the interior of said housing into a plurality of compartments extending between said openings and communicating therewith, each of said compartments being sized to receive a multiplicity of cables extending through the compartment and the open ends of the housing, said compartments also being elongated in a direction transverse to the axes of said cables, means for supporting said partitions within said housing, a lining of intumescent material on the walls of each of said compartments for expanding into and sealing each of said compartments in response to a fire, and directing means at the open ends of said compartments for focusing the expansion of said intumescent material into said compartments.

18. A multi-cable conduit as set forth in claim 17 wherein said directing means are formed as integral parts of said partitions.

19. A multi-cable conduit as set forth in claim 17 wherein at least a major portion of said intumescent material is attached to said partitions, and said directing means comprise flanges formed as integral parts of said partitions and positioned directly adjacent said intumescent material.

20. A multi-cable conduit as set forth in claim 19 wherein said partitions are separately removable from, and insertable into, said housing.

21. A multi-cable conduit comprising a housing having openings at opposite ends thereof, a plurality of partitions dividing the interior of said housing into a plurality of compartments extending between said openings and communicating therewith, each of said compartments being sized to receive a multiplicity of cables extending through the compartment and the open ends of the housing, said compartments also being elongated in a direction transverse to the axes of said cables, means for supporting said partitions within said housing, a lining of intumescent material on the walls of each of said compartments for expanding into and sealing each of said compartments in response to a fire, and sealing means including a plurality of elongated resilient blinds each of which covers an open end of one of said compartments, means for pressing the ends of said blinds against said housing, and means for slidably supporting the longitudinal edges of said blinds to permit said blinds to be separately removed for the insertion of cables in the corresponding compartments, said supporting means also interconnecting the longitudinal edges of said blinds to form a smoke seal across one open end of said housing.

22. A multi-cable conduit as set forth in claim 21 wherein each of said partitions is separately removable from, and insertable into, said housing.

23. A multi-cable conduit comprising a housing having openings at opposite ends thereof, said housing having an outwardly extending flange at one open end thereof for overlapping and supportingly engaging the surface of a floor or wall on which said conduit will be mounted, gasket means disposed adjacent said flange for positioning between said flange and the floor or wall surface, a plurality of separately removable partitions dividing the interior of said housing into a plurality of compartments extending between said openings and communicating therewith, each of said compartments being sized to receive a multiplicity of cables extending through the compartment and the open ends of the housing, said compartments also being elongated in a direction transverse to the axes of said cables, each of said partitions including a main body portion forming the partition and a pair of flanges along opposite edges thereof for engaging the opposed internal walls of said housing, means for supporting said partitions within said housing, a lining of intumescent material on the walls of each of said compartments for expanding into and sealing each of said compartments in response to a fire, a portion of said intumescent material being located on the inner surfaces of said flanges of said partitions, the ends of said flanges adjacent at least one of the open ends of said housing being turned inwardly to form directing means for focusing the expansion of said intumescent material into said compartments, a non-flammable insert for filling any of said compartments, or portions thereof, that are not filled with cables, and sealing means forming a seal between the walls of each compartment and any cables or inserts therein, at one or both of the open ends of each compartment, to limit the transmission of smoke through said compartments prior to expansion of said intumescent material.

24. A multi-cable conduit as set forth in claim 23 which includes additional intumescent material on the exterior surfaces of said housing for expanding into and sealing any clearances around the exterior of said housing in response to a fire.

25. A method of installing cables which pass through one or more floors or walls of a buliding, said method comprising inserting a conduit housing into a hole passing through the floor or wall, said housing being open on both sides of the floor or wall and having a plurality of partitions dividing the interior of said housing into a plurality of compartments extending between said openings and communicating therewith, each of said compartments being sized to receive a multiplicity of cables extending through the compartment and the open ends of the housing, said compartments also being elongated in a direction transverse to the axes of said cables, and a lining of intumescent material on the walls of each of said compartments for expanding into and sealing each of said compartments in response to a fire, passing a multiplicity of cables through the floor or wall via said compartments, providing a non-flammable insert in each of said compartments or portions thereof that are not occupied by cable, and sealing any spaces between the walls of said compartments and the cables or inserts therein to limit the transmission of smoke through said compartments prior to expansion of said intumescent material.

26. A method of installing cables as set forth in claim 25 which includes the steps of removing at least one of said partitions to form a wider compartment for receiving one or more large cables, and passing the large cables through that compartment.

27. A method of installing cables as set forth in claim 25 wherein each of said partitions includes a main body portion forming the partition and scope and a pair of flanges along opposite edges thereof for engaging the opposed internal walls of said housing, the inner surfaces of said flanges being lined with said intumescent material, and including the steps of reversing at least one of said partitions to form a wider compartment for receiving one or more large cables, and passing the large cables through that compartment.

* * * * *